F. BRIGGS.
APPARATUS FOR COOKING MEATS.
APPLICATION FILED OCT. 18, 1911.
1,079,160.
Patented Nov. 18, 1913.
2 SHEETS—SHEET 1.
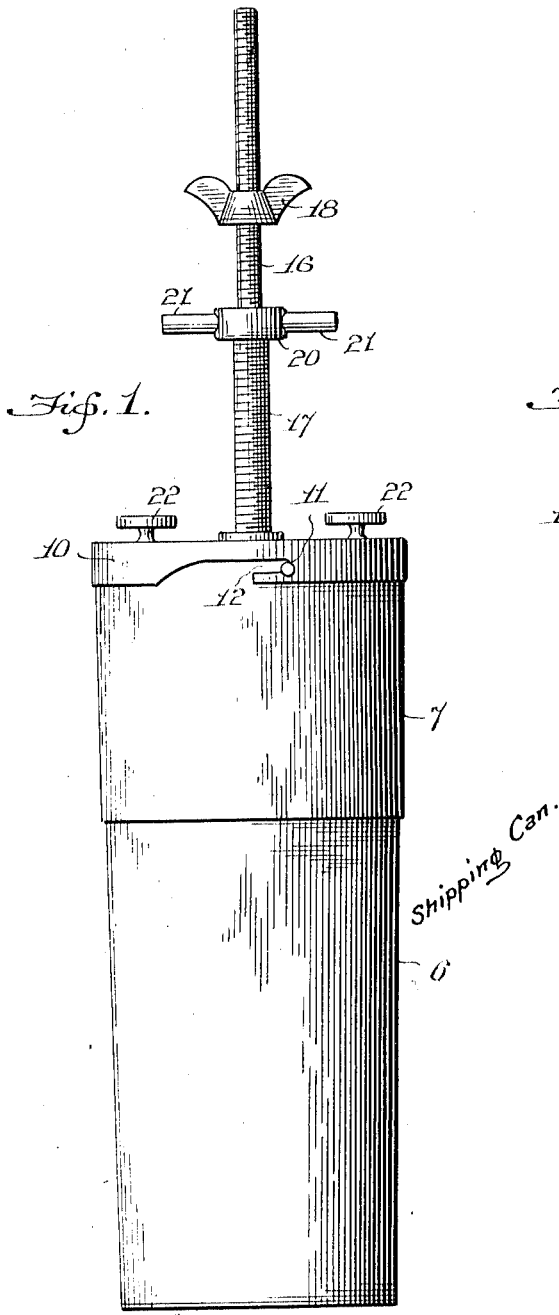
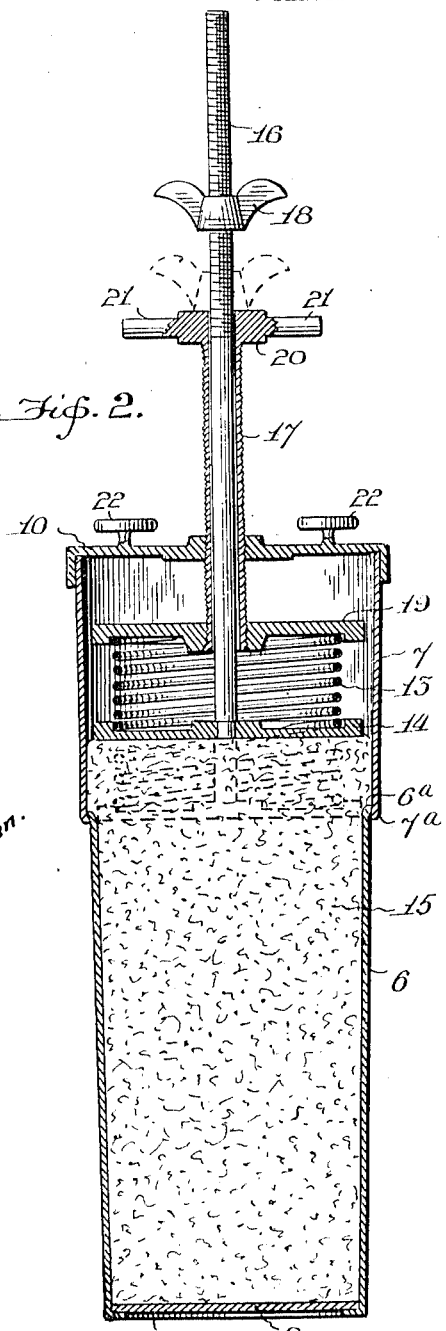
Inventor:
FREDERICK BRIGGS.
Witnesses
By Gorace E. Beall
Attorney F. BRIGGS.
APPARATUS FOR COOKING MEATS.
APPLICATION FILED OCT. 18, 1911.
1,079,160.
Patented Nov. 18, 1913.
2 SHEETS—SHEET 2.
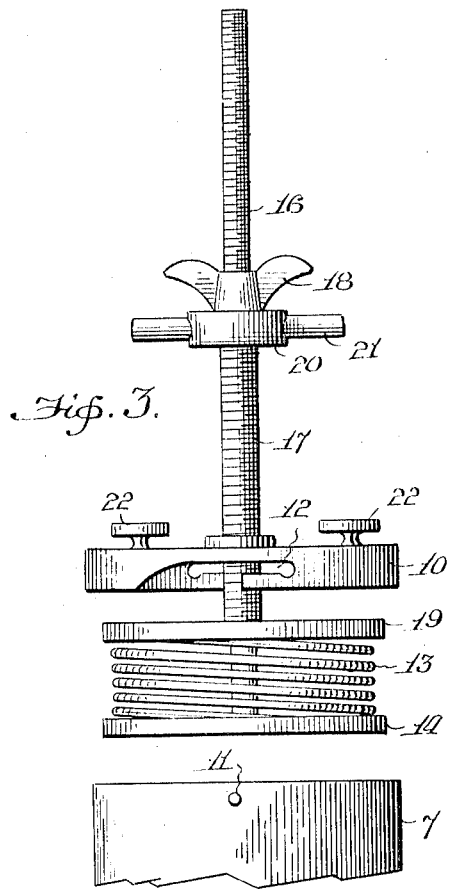
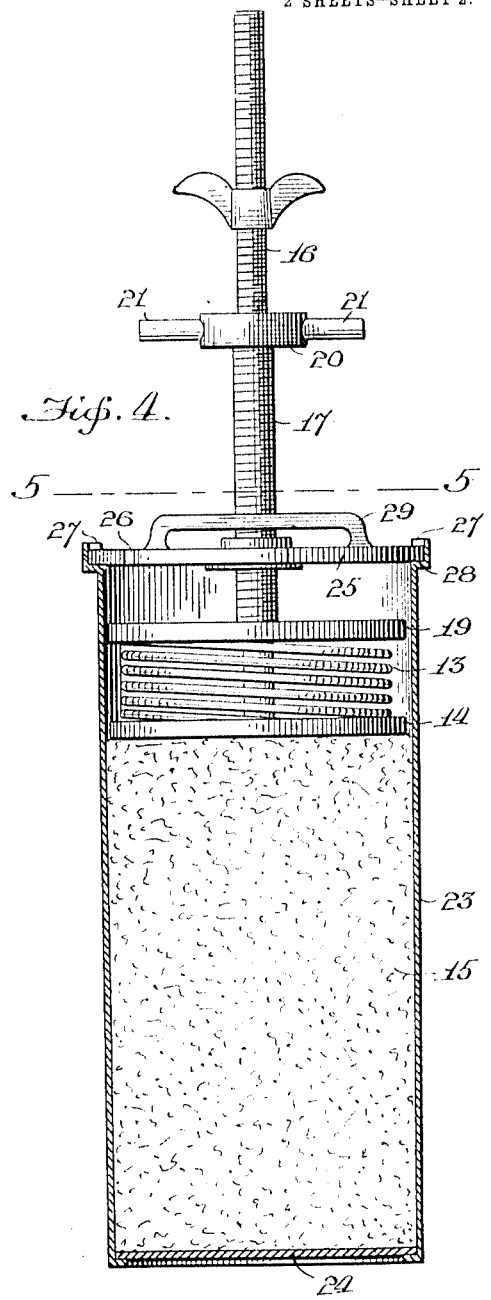
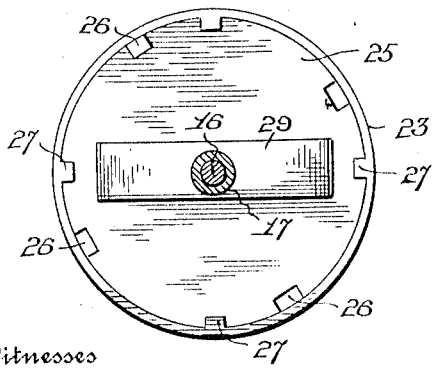
Witnesses
Inventor:
FREDERICK BRIGGS.
By
Attorney

UNITED STATES PATENT OFFICE.

FREDERICK BRIGGS, OF WASHINGTON, DISTRICT OF COLUMBIA.

APPARATUS FOR COOKING MEATS.

1,079,160.  Specification of Letters Patent.  Patented Nov. 18, 1913.

Application filed October 18, 1911. Serial No. 655,323.

*To all whom it may concern:*

Be it known that I, FREDERICK BRIGGS, a citizen of the United States, residing at Washington, in the District of Columbia, have invented certain Improvements in Apparatus for Cooking Meats, of which the following is a full and complete specification.

My invention relates to apparatus for cooking meats, especially hams, and is more especially an improvement upon the apparatus shown and described in the prior application filed by Augustus R. Lendner and myself on June 16th, 1911, Serial No. 633,537.

The primary object of my present invention is to provide a cooking apparatus of this character with means for accurately indicating the shrinkage of the meat during the operation of cooking, and to limit the action of the spring by means of which the meat is compressed or packed while cooking.

A further object of my present invention is to provide means for confining the spring under tension during the operation of assembling the parts after the meat has been placed in the receptacle, and to adjust said spring to suit different conditions.

Other objects and advantages of the present invention will hereinafter appear, and what I claim as new and desire to secure by Letters-Patent of the United States is fully set forth in the appended claims.

In the accompanying drawings, which form a part of this specification: Figure 1 is a side elevation showing the improved cooking apparatus with the parts assembled and adjusted ready for cooking the meat which is contained within the receptacle under pressure. Fig. 2 is a vertical longitudinal sectional view through said apparatus. Fig. 3 is a side elevation of the device employed for exerting pressure upon the meat, showing the parts of said device arranged for application to the receptacle containing the meat. Fig. 4 is a vertical longitudinal sectional view illustrating a slight modification of the invention. Fig. 5 is a transverse sectional view on the line 5—5 of Fig. 4.

Like numerals of reference indicate like parts in all the figures of the drawings.

The receptacle in which the meat is cooked and compressed is preferably composed of two parts; to wit, a tapered can or container 6, and a correspondingly tapered cylinder 7 forming a continuation of the can, said parts telescoping one within the other and connected more securely by interlocking flanges 6ª and 7ª, respectively, all of the meat being compressed within the can during cooking so that the latter may be used for shipping the meat. The can 6 is provided with a loose bottom 8 resting upon an inturned flange 9, and the upper end of the cylinder or extension 7 is closed by means of a removable cap 10, secured thereto by opposite pins 11 and bayonet slots 12. The meat, as 15, which is placed within the can 6 and extends into the lower part of the cylinder 7 is compressed during the operation of cooking by means of a helical spring 13 exerting pressure upon a plunger 14 placed on top of the meat.

In cooking meat, particularly hams, the amount of shrinkage which it will undergo during the operation of cooking, augmented by the action of the spring 13, can be very accurately determined, and in order that this shrinkage may be properly indicated I provide the plunger 14 with an indicating rod 16, which in the present instance extends up through a hollow shaft 17, and carries an indicator in the form of a nut 18 threaded on the rod, said indicator being located above the upper end of the meat receptacle so that it may be seen while the meat is cooking. In setting this indicator the plunger is allowed to rest upon the meat or ham and then the nut is turned until it reaches a point a certain distance above the upper end of the hollow shaft or stop device 17, according to the amount of shrinkage desired for that particular ham; for instance, if a ham will be properly done after a shrinkage of one inch, with respect to the size of the ham and dimensions of the receptacle, the adjusting nut or indicator 18 would be set one inch above the upper end of the shaft or stop device 17. Therefore, the gradual shrinkage of the ham can be watched, and when the indicator strikes against the end of the shaft it will denote that the ham is done, and will also arrest the plunger at the upper end of the can so that the cooked and compressed meat will exactly fill said can.

Of course any form of stop device for the indicator may be provided, but in the present instance the shaft 17, forming such stop, also provides for adjusting the spring, that is, increasing or diminishing its tension according to the position of the plunger, and for this purpose said shaft is threaded through the cap 10, and carries within the cylinder a follower 19, between which latter and the aforesaid plunger 14 the spring 13 is confined. The hollow shaft or screw 17 is provided at its upper end with a head 20 and arms 21, for convenience in turning the same, said arms forming also a convenient means for handling the apparatus as a whole. For convenience in turning the cap 10, in locking and unlocking the same on the upper end of the meat receptacle, said cap is provided with projections or buttons 22.

In assembling the parts for cooking a ham, or other meat, the can 6 and cylinder 7 are connected by passing said can through the cylinder until the flanges interlock, and after placing the meat within this receptacle the pressure device, with the spring confined under pressure between the plunger 14 and follower 19, is placed within the upper part of the cylinder 7 and the cap 10 turned into locked engagement with the pins 11. The screw 17 is then turned until the plunger rests upon the meat, and the nut 18 adjusted the proper distance above the upper end of the screw, according to the amount of shrinkage desired. It will be understood, of course, that in assembling the parts of the pressure device the spring is placed between the plunger 14 and follower 19, and the rod 16, which is attached to the plunger, is passed up through the hollow screw, so that by threading the nut 18 on the upper end of the rod the spring may be compressed to the desired extent between the plunger and follower, and, of course, in removing the pressure device after the meat is cooked the spring is confined so that said device may be easily removed. Furthermore, the parts of this device may be all separated so that they may be thoroughly cleaned after each cooking operation.

Instead of providing a meat receptacle in two parts I may in some instances provide a meat receptacle such as shown in Fig. 4, in which a single can, as 23, is provided, having the slidable bottom 24, for convenience in forcing the meat out of the receptacle and to provide for circulation of the water in which the meat is cooked at the lower end of the receptacle. In this instance the meat, after being cooked, is removed from the receptacle and placed in a carton of proper size for shipping. In the modification shown in Figs. 4 and 5, there is also a different means for securing the cap on the upper end of the meat receptacle. In this instance a disk-cap 25 is provided, having notches 26 at its edges through which pass tongues 27 at the upper edge of the receptacle, the latter being offset at its upper end to provide a supporting shoulder 28. In this modification the cap is provided with a strap-handle 29, instead of the buttons 22.

As will be noted, the pressure device is of the same construction as that shown in the other views of the drawings.

Having thus described my invention, I claim:—

1. In an apparatus for cooking meat, a receptacle comprising two relatively movable sections, one of said sections being provided with means arranged to engage the other section for limiting the relative movement of the sections, one of said sections constituting a shipping can for the meat, a top for said receptacle, a plunger disposed within the receptacle, a follower disposed within the receptacle, a spring disposed between said plunger and said follower, a sleeve for supporting the follower, said sleeve being arranged to pass through the top, a handle secured to said sleeve for adjusting the position of the follower with respect to the top, a plunger rod arranged to pass through said sleeve and an adjustable nut carried by the plunger rod and arranged to engage the sleeve for limiting the movement of the plunger.

2. In an apparatus for cooking meat, a receptacle comprising two telescopic sections, one of said telescopic sections having an inwardly extending flange at its lower edge, a movable bottom arranged to engage said flange, means for limiting the movement of one of said sections relative to the other, a top for said receptacle, a plunger disposed within the receptacle and having a plunger stem, a follower disposed within the receptacle, a threaded sleeve for supporting said follower arranged to pass through the top, the stem of the plunger being arranged to extend through said sleeve, a handle for turning said sleeve to move the follower, a spring disposed between the plunger and the follower, and an adjustable thumb nut carried by the plunger rod and arranged to engage the end of the sleeve for limiting the movement of the plunger.

3. In an apparatus for cooking meat, a receptacle comprising a pair of tapered telescopic sections, means for limiting the telescopic movement of one section relative to the other, a top removably connected with the end of one of said sections, said top having a central opening provided with a screw thread, a threaded sleeve arranged to engage the threaded opening, a follower carried by said sleeve, a plunger disposed within said receptacle, a plunger rod arranged to extend through said sleeve, and a spring disposed between said follower and said plunger for forcing said plunger away from said follower.

4. In an apparatus for cooking meat, a receptacle comprising a pair of tapered telescopic sections, a flange carried by each section and arranged to engage the flange on the other section for limiting the outward movement of the sections, a top removably connected with the end of one of said sections, said top having a central opening provided with a screw thread, a threaded sleeve arranged to engage the threaded opening, a follower carried by said sleeve, a plunger disposed within said receptacle, a plunger rod arranged to extend through said sleeve, a spring disposed between said follower and said plunger for forcing said plunger away from said follower, and means connected with said sleeve for adjusting the position of the follower with respect to the top.

5. In an apparatus for cooking meat, a receptacle comprising a pair of tapered telescopic sections, a flange carried by each section and arranged to engage the flange on the other section for limiting the outward movement of the sections, a top removably connected with the end of one of said sections, said top having a central opening provided with a screw thread, a threaded sleeve arranged to engage the threaded opening, a follower carried by said sleeve, a plunger disposed within said receptacle, a plunger rod arranged to extend through said sleeve, a spring disposed between said follower and said plunger for forcing said plunger away from said follower, means connected with said sleeve for adjusting the position of the follower with respect to the top, and an adjustable nut carried by said plunger rod for limiting the movement of the plunger.

FREDERICK BRIGGS.

Witnesses:
H. P. HOWARD, Jr.,
J. P. SELLMAN.